United States Patent
Billou (10) Patent No.: US 9,959,559 B2
(45) Date of Patent: May 1, 2018

(54) RANKING AND RECOMMENDATION ALGORITHMS FOR SEARCH LISTINGS

(71) Applicant: eBay Inc.

(72) Inventor: Frederic Billou, Woodside, CA (US)

(73) Assignee: eBay Inc., San Jose, CA (US)

( * ) Notice: Subject to any disclaimer, the term of this patent is extended or adjusted under 35 U.S.C. 154(b) by 991 days.

(21) Appl. No.: 14/169,856

(22) Filed: Jan. 31, 2014

(65) Prior Publication Data

US 2015/0220602 A1    Aug. 6, 2015

(51) Int. Cl.
*G06Q 30/00* (2012.01)
*G06Q 30/06* (2012.01)
*G06F 17/30* (2006.01)

(52) U.S. Cl.
CPC ..... *G06Q 30/0625* (2013.01); *G06F 17/3087* (2013.01)

(58) Field of Classification Search
CPC .............. G06Q 30/0625; G06F 17/3087
USPC .................... 705/26.1, 27.2, 14, 39
See application file for complete search history.

(56) References Cited

U.S. PATENT DOCUMENTS

| | | | |
|---|---|---|---|
| 8,266,011 B2 | 9/2012 | Torrenegra et al. | |
| 8,375,025 B1 | 2/2013 | Datar et al. | |
| 2007/0288422 A1* | 12/2007 | Cao | G06F 17/30241 |
| 2013/0232062 A1* | 9/2013 | Leventhal | G06Q 10/1053 |
| | | | 705/39 |

* cited by examiner

*Primary Examiner* — William Allen
*Assistant Examiner* — Anand Loharikar
(74) *Attorney, Agent, or Firm* — Shook, Hardy & Bacon L.L.P.

(57) ABSTRACT

In various exemplary embodiments, a system and associated method for prioritizing search results in an electronic environment is disclosed. The system comprises a communications module to receive a search query from a searching party located in a geographic region and a search engine to conduct a search and generate search results. A query engine identifies the geographic region of the searching party and identifies a language associated with the identified geographic region of the searching party based on the identified geographic region of the searching party. The search results are prioritized based on the identified language.

15 Claims, 4 Drawing Sheets

RANKING AND RECOMMENDATION ALGORITHMS FOR SEARCH LISTINGS

TECHNICAL FIELD

The present application relates generally to the field of computer technology and, in a specific exemplary embodiment, to a system and method of optimizing a response to a search or query of an end-user based on a detection of a region of the end-user.

BACKGROUND

During the past several years, a substantial growth has occurred in the quantity and diversity of information and services available over the Internet. The number of Internet users has similarly grown rapidly. A predominant growth area on the Internet has been in the use of the World Wide Web, often referred to as WWW, W3, or simply "the Web." The hyper-text transfer protocol (HTTP) that serves as a foundation protocol for the Web has been widely adopted and implemented in numerous Web browsers and Web servers.

Web browsers provide a convenient user application for receiving textual and graphical information of individual Web pages in a scrollable display page format. The Web pages frequently allow a typical end-user to access a variety of educational, commercial, and retail Web sites through search boxes.

The emergence of electronic commerce, including online auction sites as well as fixed-price sites, has revolutionized the manner in which goods and services may be bought and sold. In particular, the development of network based commerce systems has enabled individuals to sell items with relatively little effort or expense while at the same time reaching a much larger potential pool of buyers than using more traditional means such as classified advertising and garage sales. In fact, an Internet enabled commerce site can extend well beyond geographical and cultural boundaries and potentially have a global reach. Consequently, one of the difficult challenges in developing a network based electronic commerce site is developing a site that allows sellers and buyers to communicate despite potential language barriers.

In a typical electronic commerce system, a seller posts an item for sale and describes the particular item in his or her native language. Unless a potential buyer can read and understand the seller's native language, the potential buyer will have no way of finding or understanding the seller's posting. Consequently, there is little if any chance that a potential buyer and a seller that have different native languages will ever enter into a transaction, or be presented with meaningful search results or listings in a native language.

BRIEF DESCRIPTION OF DRAWINGS

Various ones of the appended drawings merely illustrate exemplary embodiments of the present invention and cannot be considered as limiting its scope.

DETAILED DESCRIPTION

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on end-user queries in an electronic retail environment, the embodiments are given merely for clarity in disclosure. Thus, any type of electronic commerce or electronic business system and method, including various system architectures, may employ various embodiments of the end-user query auto-complete system and method described herein and is considered as being within a scope of the present subject matter.

Overview

For customer-to-customer cross border transactions in particular, buyers may be more likely to purchase from sellers who speak the same language as they do as this is likely to ensure smoother communication pre- and/or post-transaction. The present disclosure seeks to leverage this advantage in ranking algorithms, recommendation algorithms, and other marketing tools to surface relevant items in search results accordingly. For instance, if a buyer in Mexico is looking for an item available from both a Spanish and a German seller, a ranking algorithm surfaces the item from the Spanish seller first (everything else being equal), or assigns a relevance weight to the language "match" (i.e., favors items in which buyers and sellers speak the same language).

In some examples, the present subject matter relates to a method and system for inferring the language of a buyer and a seller in an electronic environment (such as an online marketplace) to promote a common transaction language and a facilitated transaction. Typically, either party is less likely to misinterpret the terms of a sale if they share a common language. When a buyer searches for a product, the example system or method detects from which region the party is searching and makes a language determination for that region (e.g. Spanish for Spain or Mexico). In conducting a search, the example system or method detects the language of a region where product sellers are located and ranks sellers having a language in common with the buyer higher in a listing of search results.

In some examples, a determination of language for ranking search listings (or creating other recommendations) is based on detection of a region of a searching party, as opposed to an implicit language determination (such as the language of a search query, for example) or an explicit determination of language preferences (such as a user selection of a check box for a language, a language preference for a web browser, or a search engine account, for example.) In some examples of the present subject matter, a language determination is based on geographic indicators, such as IP address or a shipping address.

Some examples look at more than a simple matching of languages. In some embodiments, methods and systems can look at language similarity. For example, although Italian is a different language than Spanish, it is still closer to Spanish than Arabic or Chinese. Different weights for ranking can be assigned based on a language similarity; for example, ranking weights might be: 1) Italian and Italian; 2) Italian and Spanish; or 3) Italian and Chinese, and so forth. It will be appreciated that many combinations of language detection and weighting are possible in the creation of prioritized search results.

Some examples use feedback from other buyers of the same or similar language regarding their experience with a given seller. Some examples use purchase and return rates for such buyers transacting with this seller, or use generalized statistics for buyers and sellers transacting in the same, similar, or different languages.

Other examples determine a language for prioritizing search results by using demographic information, such as population immigration patterns for regions in which a buyer or seller is located. Other examples of methods and systems disclosed herein determine the proficiency of seller in a certain language by analyzing a listing. For example, a seller might have listed item in English even though he or she is not proficient in English. In another example, the proficiency of a seller in a certain language is derived by conducting a small test of the seller's proficiency in that language before an item listing is posted in the electronic environment.

Thus, in some embodiments, a system for ranking or prioritizing search results in an electronic environment is disclosed. The system comprises a communications module to receive a search query from a searching party located in a geographic region; a search engine to conduct a search and generate search results; and a query engine to identify the geographic region of the searching party, identify a language associated with the identified geographic region of the searching party based on the identified geographic region of the searching party; and prioritize the search results based on the identified language.

In another exemplary embodiment, a method to prioritize or rank search results in an electronic environment in response to a search query received from a searching party located in a geographic region is disclosed. The method comprises conducting a search and generating search results; identifying the geographic region of the searching party; identifying a language associated with the identified geographic region of the searching party based on the identified geographic region of the searching party; and prioritizing the search results based on the identified language.

In another exemplary embodiment, a machine-readable storage medium (e.g., a DVD or CD-ROM) storing an instruction is disclosed such that, when executed by a processor, it causes the processor to perform a method to rank or prioritize search results in an electronic environment in response to a search query received from a searching party located in a geographic region. The method includes conducting a search and generating search results; identifying the geographic region of the searching party; identifying a language associated with the identified geographic region of the searching party based on the identified geographic region of the searching party; and prioritizing the search results based on the identified language.

Each of these exemplary embodiments, and others, is discussed in detail, below.

Systems

Figure 1:
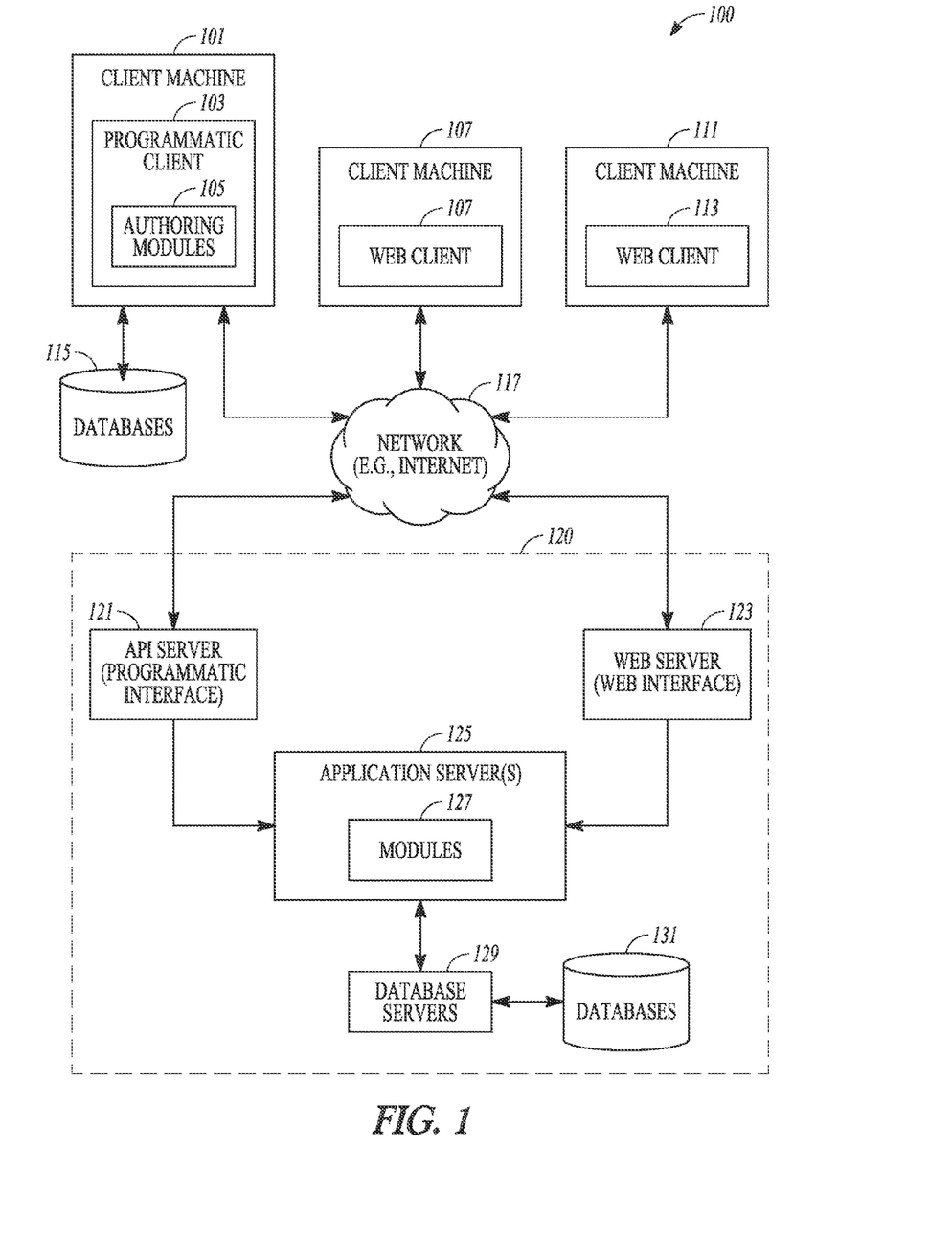
FIG. 1 is a block diagram of an exemplary embodiment of a high-level client-server-based network architecture diagram depicting a system used to process end-user queries.

With reference to FIG. 1, a high-level network diagram of an embodiment of an exemplary system 100 with a client-server architecture includes a first client machine 101, a second client machine 107, a third client machine 111, a network 117 (e.g., the Internet), and an information storage and retrieval platform 120. The information storage and retrieval platform 120 may constitute a commerce platform or commerce server and provides server-side functionality, via the network 117, to the first 101, second 107, and third 111 client machines. A programmatic client 103 in the form of authoring modules 105 is executing on the first client machine 101, a first web client 109 (e.g., a browser, such as the Internet Explorer browser developed by Microsoft Corporation of Redmond. Wash.) is executing on the second client machine 107, and a second web client 113 is executing on the third client machine 111. Additionally, the first client machine 101 is coupled to one or more databases 115.

Turning to the information storage and retrieval platform 120, an application program interface (API) server 121 and a web server 123 are coupled to, and provide programmatic and web interfaces respectively to, one or more application servers 125. The application servers 125 host one or more modules 127 (e.g., modules, applications, engines, etc.). The application servers 125 are, in turn, coupled to one or more database servers 129 that facilitate access to one or more information storage databases 131. The one or more modules 127 provide a number of information storage and retrieval functions and services to users that access the information storage and retrieval platform 120. The one or more modules 127 are discussed in more detail, below.

While the exemplary system 100 of FIG. 1 employs a client-server architecture, a skilled artisan will recognize that the present disclosure is not limited to such an architecture. The exemplary system 100 could equally well find application in a distributed, or peer-to-peer, architecture system. The one or more modules 127 and the authoring modules 105 may also be implemented as standalone software programs, which do not necessarily have networking capabilities.

The first 109 and second 113 web clients access the one or more modules 127 via the web interface supported by the web server 123. Similarly, the programmatic client 103 accesses the various services and functions provided by the one or more modules 127 via the programmatic interface provided by the API server 121. The programmatic client 103 may be, for example, a seller application (e.g., the "Turbo Lister 2" application developed by eBay Inc., of San Jose, Calif.) enabling sellers to author and manage data items or listings on the information storage and retrieval platform 120 in an off-line manner. Further, batch-mode communications can be performed between the programmatic client 103 and the information storage and retrieval platform 120. In addition, the programmatic client 103 may include, as previously indicated, the authoring modules 105 used to author, generate, analyze, and publish domain rules and aspect rules used in the information storage and retrieval platform 120 to structure data items and transform queries. Such domain and aspect rules are known independently in the art.

Figure 2:
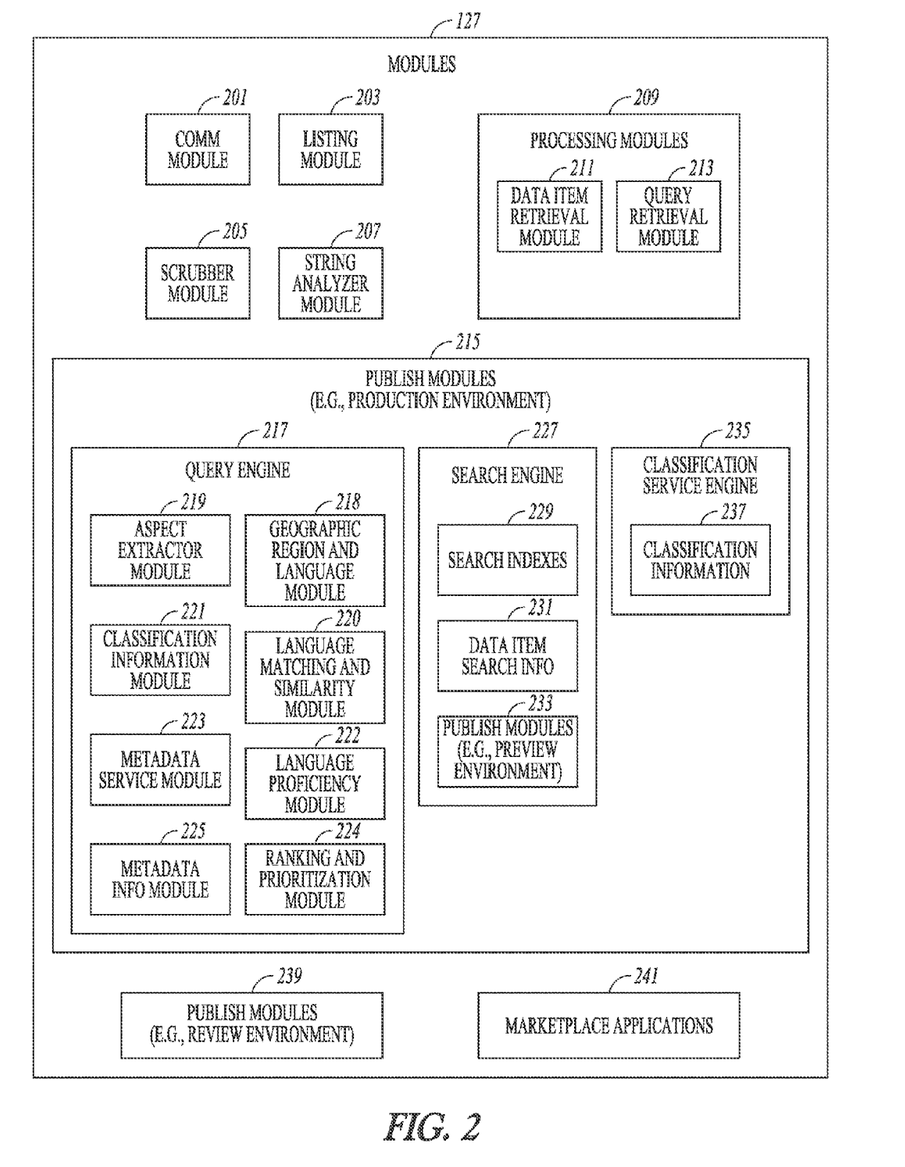
FIG. 2 is a block diagram illustrating an exemplary embodiment of various modules of the network architecture of FIG. 1.

Referring now to FIG. 2, an exemplary block diagram of the one or more modules 127 includes a communication module 201, a listing module 203, a scrubber module 205, a string analyzer module 207, a plurality of processing modules 209, and a first 215 and second 239 publishing module. The first publishing module 215 is used in a production environment while the second publishing module 239 is used in a preview environment. The one or more modules 127 further include a marketplace application block 241. Each of the first 215 and second 239 publishing modules includes a query engine 217, a search engine 227, and a classification service engine 235 which includes classification information 237 (the individual engines are only shown in the first publishing module 215 but are readily envisioned by a skilled artisan in the second publishing module 239 as well). The first 215 and second 239 publishing modules are each utilized to publish new or existing rules to either the production environment or the preview environment, as appropriate, in the information storage and retrieval platform 120 of FIG. 1, thereby enabling the rules to be operative (e.g., applied to data items and queries) in the respective environments.

In a specific exemplary embodiment, the information storage and retrieval platform 120 of FIG. 1 may be embodied as a network-based marketplace that supports the transaction of data items or listings (e.g., goods or services) between sellers and buyers. One such marketplace is eBay, the World's Online Marketplace, developed by eBay Inc., of San Jose, Calif. In this specific exemplary embodiment, the information storage and retrieval platform 120 may receive information from sellers describing the data items that may subsequently be retrieved by potential buyers or bidders. The one or more modules 127 may therefore include the marketplace application block 241 to provide a number of marketplace functions and services to end-users that access the information storage and retrieval platform 120.

The preview environment enables a category manager (not shown) to analyze rules and determine whether such rules perform as expected without affecting live operations in the production environment. For example, the preview environment enables a geographic region and language analysis, a language matching and similarity analysis, a language proficiency analysis, and a ranking and prioritization analysis as described later in this document. After determining that rules perform as expected, the category manager publishes the rules to the production environment in the information storage and retrieval platform 120.

The communication module 201 receives a query from one or more of the client machines 101, 107, 111 (FIG. 1). The query may include a search query from a searching party located in a geographic region. The query may also include one or more constraints (e.g., keywords, categories, or information specific to a type of data item). The communication module 201 interacts with the query engine 217 and the search engine 227 to process the query. A query retrieval module 213 receives information from one or more of the client machines 101, 107, 111 and stores the information as a data item in the one or more information storage databases 131 (FIG. 1). In one example, a searching party (e.g., an end-user such as a buyer) may operate one of the one or more of the client machines 101, 107, 111 to enter a search query for items listed for sale in an electronic environment. In another example, an end-user acting as a seller may operate one of the one or more of the client machines 101, 107, 111 entering descriptive information for a data item for the purpose of offering the data item for sale or auction through the information storage and retrieval platform 120.

The plurality of processing modules 209 receives classification information and metadata information. The plurality of processing modules 209 publishes the classification and metadata information to a production environment or a preview environment. The plurality of processing modules 209 may also publish to the production environment by publishing the classification and metadata information to backend servers (not shown) that host the query engine 217, the search engine 227, and the classification service engine 235. The plurality of processing modules 209 publishes to a preview environment by publishing the classification and metadata information to a local backend server (not shown) hosting the query engine 217, the search engine 227, and the classification service engine 235.

The plurality of processing modules 209 further includes a data item retrieval module 211 to receive requests for data items from a category manager operating the first client machine 101. For example, responsive to receiving a request, the data item retrieval module 211 reads data items from the data item information stored on the one or more information storage databases 131 (FIG. 1) and stores the data items as sample information in the database 115.

The query retrieval module 213 receives requests for queries from a category manager operating the first client machine 101. For example, responsive to receiving the request, the query retrieval module 213 reads queries from the sample information and communicates the queries to the first client machine 101.

The scrubber module 205 receives item information entered by one or more of the client machines 101, 107, 111 creating a data item. The scrubber module 205 utilizes services of the classification service engine 235 to structure the item information in the data item (e.g., applies domain and aspect rules).

The string analyzer module 207 receives requests from the first client machine 101 to identify candidate values to associate with an aspect. The request may include the aspect and one or more values that have been associated to the aspect. The string analyzer module 207 utilizes the aspect (e.g., "color") to identify strings of text in a database that includes the aspect. The string analyzer module 207 relies on various services provided in the information storage and retrieval platform 120 to identify and process the strings of text. For example, the string analyzer module 207 utilizes services that expand the aspect to a derivative form of the aspect including a singular form (e.g., "color"), a plural form (e.g., "colors"), a synonymous form, an alternate word form (e.g., "chroma," "coloring," "tint"), a commonly misspelled form (e.g., "collor") or an acronym form.

In a specific exemplary embodiment, the string analyzer module 207 identifies boundaries of a string of text based on a position of the aspect and derivatives thereof in the string of text. For example, the string analyzer module 207 identifies boundaries of the string of text based on a predetermined number of words to the left and right of the aspect in the string of text. The predetermined number of words may be a configurable value. After the strings of text have been identified, the string analyzer module 207 relies on a service in the information storage and retrieval platform 120 to remove any stop words from the strings (e.g., "the," "and," or "if"). For example, stop words may include prepositions and antecedents since they are not candidate values. Next, the string analyzer module 207 removes the aspect values received in the request from the string. Finally, the string analyzer module 207 returns the remaining candidate values to the first client machine 101.

A database (not shown specifically) utilized by the string analyzer module 207 includes queries that have been entered by a user to the information storage and retrieval platform 120 or data items that have been entered by a user to the information storage and retrieval platform 120, dictionaries, or thesauruses. The string analyzer module 207 analyzes the strings of text to identify candidate values to associate with the aspect. More examples of query strings and searching techniques are possible.

The classification service engine 235 applies domain rules and aspect rules to data items. For example, the classification service engine 235 applies domain rules to identify one or more domain-value pairs (e.g., product type=electronic MP3 players) associated with the data item. The classification service engine 235 further applies the aspect rules to identify aspect-value pairs (e.g., brand=Apple) associated with the data item. The classification service engine 235 applies the domain and aspect rules to data items or listings as they are added to the information storage and retrieval platform 120 or responsive to the publication of new rules (e.g., domain rules or aspect rules).

The classification service engine 235 processes data items received from the second 107 and third 111 client machines. For example, the scrubber module 205 uses services of the classification service engine 235, as described previously, to apply domain rules and aspect rules to the data item. The classification service engine 235 further stores the data item, with the associated domain-value pairs and aspect-value pairs, in the one or more information storage databases 131 (FIG. 1) as item search information. Further, the classification service engine 235 pushes or publishes item search information over a bus (not shown but implicitly understood by a skilled artisan) in real time to the search engine 227. The classification service engine 235 executes in the preview environment, thereby enabling analysis of newly authored rules before publication of the rules to the production environment. The classification service engine 235 further maintains histogram information in the form of data item counters as the domain and aspect rules are applied to the data items. For example, the classification service engine 235 may increment a data item counter responsive to a condition clause in a domain or aspect rule evaluating TRUE. The histogram information communicates to one or more of the client machines 101, 107, 111 that utilize the histogram information to determine percentage coverage for most popular queries, domains, aspects, and aspect-value pairs.

The query engine 217 includes a geographic region and language module 218, an aspect extractor module 219, a language matching and similarity module 220, a classification information module 221, a language proficiency module 222, a metadata service module 223, a ranking and prioritization module 224, and a metadata information module 225. The various modules 218-225 cooperatively interact to prioritize or rank search results in accordance with methods described herein.

In response to a search query received from a searching party located in a geographic region (Spain, Mexico, Germany, for example), the geographic region and language module 218 identifies the geographic region of the searching party, and identifies (or assigns) a language associated with the identified geographic region of the searching party. The language identification, or assignation, is based on the identification of the geographic region of the searching party. In some cases, (for example, regions having multiple dialects), a language may be assigned to that region by the geographic region and language module 218 based on other factors. Example factors can include geographic indicators, such as an IP or shipping address. The language identification, or assignation, is not based (or at least, not based solely) on prior techniques such as an implicit language determination (the language of a search query, for example) or an explicit determination of language preferences (a user selection of a check box for a language, a language preference for a web browser, or a search engine account, for example.)

The aspect extractor module 219 receives the most popular queries from one or more of the client machines 101, 107, 111 and applies aspect rules to extract aspect-value pairs from the query. Further, the aspect extractor module 219 maintains histogram information in the preview environment while applying the aspect rules to the queries.

The language and similarity module 220 assists in prioritizing search results based on a matching or similarity between the identified (or assigned) language of the geographic region of the searching party (for example, an end-user as a buyer) and the identified (or assigned) language of the geographic region of another end-user (for example, a seller). A relevance weighting may be assigned by the language and similarity module 220 to an item listed in the search results based on a degree of matching or similarity between the language of the geographic region of the searching party and the language of the geographic region of the seller. The search results can be prioritized accordingly by the ranking and prioritization module 224, discussed further below.

The metadata service module 223 communicates metadata information to the communication module 201 based on a query received from the communication module 201. The metadata information includes metadata that the communication module 201 uses to format and generate an interface (e.g., a user interface).

The search engine 227 conducts searches based on a received search query and produces search results. In some cases, the search results include raw data, which is then ranked or prioritized in accordance with the methods described herein. In one embodiment, the search engine 227 includes search indexes 229 and data item search information 231 (e.g., including data items and associated domain-value pairs and aspect-value pairs). In the production environment, the search engine 227 receives the transformed query from the communication module 201 and utilizes the search indexes to identify data items based on the transformed query. Further, in the production environment, the search engine 227 communicates the found data items to the communication module 201.

The language proficiency module 222 can determine a proficiency of an end-user (such as a seller) in a language associated with the geographic region of the searching party (for example, a buyer) and, in conjunction with the ranking and prioritization module 224, prioritize the raw search results based on the determined proficiency. In some examples, the language proficiency module 222 of the query engine 217 can determine the proficiency of the seller in the language associated with the geographic region of the buyer based on one or more factors. Such factors can include feedback derived from other searching parties (buyers) in the electronic environment. In other examples, a language competency test is conducted at a time of listing an item for sale in the electronic environment. The results of the proficiency test are used to prioritize that listing in the search results to better match or suit the identified language of a buyer looking for that item. Conveniently, the language proficiency test is small and un-burdensome and can be completed quickly.

In some examples, the language proficiency module 222 conducts a language proficiency analysis of a listing of a seller offering an item for sale in the electronic environment. A degree of expertise in a language can be derived from idiom and word use, spelling accuracy, and so forth. In other examples, an analysis of purchase and return dates in the electronic environment is conducted. Here, the inference is that a seller (or buyer) engaged in excessive purchase and return activity in listings offered in a given language is potentially displaying, through an elevated level of misunderstandings in transaction, a lower level of proficiency in or comfort with that language. This information can be used to rank and prioritize (in this case, downwardly) listings of a seller identified as being less proficient in a buyer's language. In other examples, demographic information, such as immigration patterns, birth rates, and so forth associated with the geographic region of a buyer or a seller can be used in an algorithm to rank search results.

The ranking and prioritization module 224 works in conjunction with the other modules 218, 220, and 222 to prioritize the search results based, at least, on the identified language of the searching party, such as a buyer, in the electronic environment. Additional modules and engines associated with the described systems may be employed. It should be appreciated that modules or engines may embody various aspects of the details described herein.

While various embodiments of the present subject matter are described with reference to assorted implementations and exploitations, it will be understood that these embodiments are illustrative only and that a scope of the present subject matter is not limited to them. In general, techniques for the ranking algorithm or method may be implemented with facilities consistent with any hardware system or hardware systems defined herein. Many variations, modifications, additions, and improvements are possible.

Plural instances may be provided for resources, operations, or structures described herein as a single instance. Finally, boundaries between various resources, operations, and data stores are somewhat arbitrary, and particular operations are illustrated in a context of specific illustrative configurations. Other allocations of functionality are envisioned and may fall within a scope of various embodiments of the present subject matter. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of the present subject matter that is represented by the appended claims.

Methods

Figure 3:
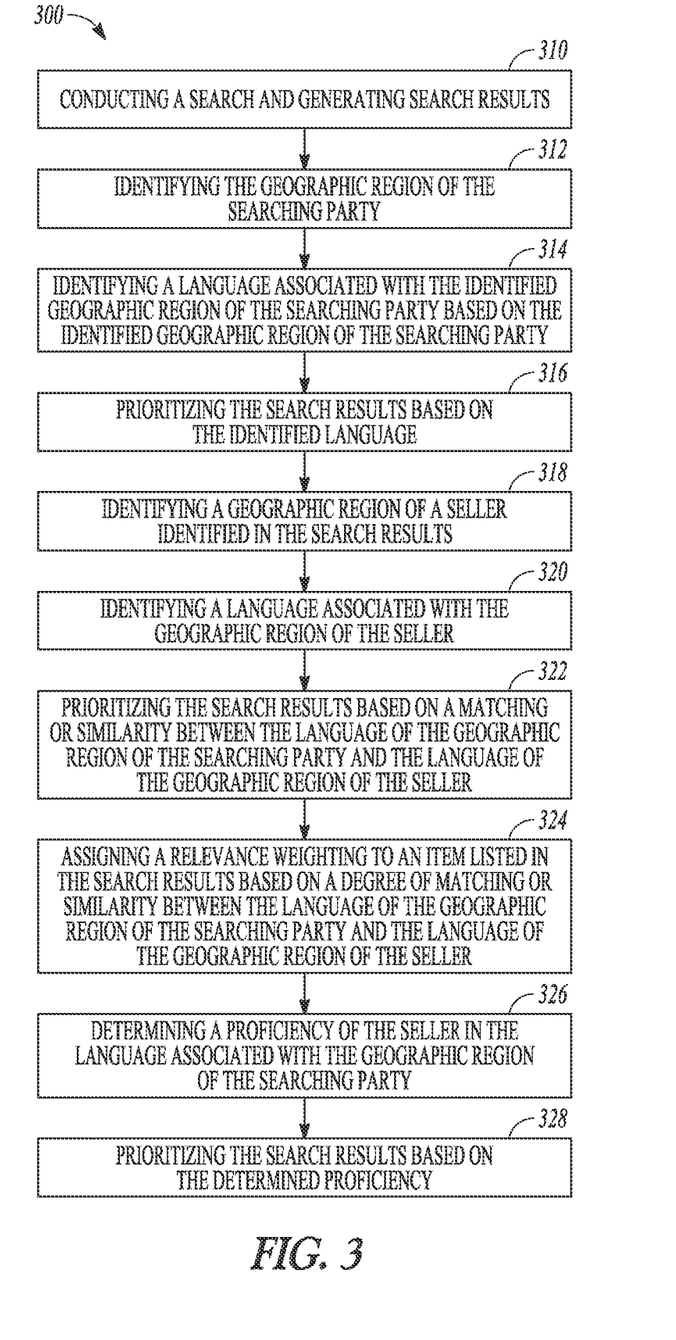
FIG. 3 is a flowchart of an exemplary method to prioritize search results in an electronic environment in response to a search query received from a searching party located in a geographic region, according to an example embodiment.

Some of the embodiments disclosed herein include methods. FIG. 3 is a flowchart illustrating a method 300 to prioritize search results in an electronic environment (e.g. system 100, FIG. 1) in response to a search query received from a searching party located in a geographic region. The operations of method 300 may be performed by the client machine 101, client machine 107, client machine 111, and/or a server included in the retrieval platform 120 (e.g., API server 121, web server 123, or application servers 125). The operations may be performed by one or more modules (e.g., those described with reference to FIG. 2). The various operations of the method 300 may be performed in different orders, and the method 300 may include only some of the operations described below.

The method 300 may comprise, at operation 310, conducting a search and generating search results; at operation 312, identifying the geographic region of the searching party; at operation 314, identifying a language associated with the identified geographic region of the searching party based on the identified geographic region of the searching party; and, at operation 316, prioritizing the search results based on the identified language. Identifying the geographic region of the searching party may be based on a geographic indicator, such as an IP or shipping address.

The method 300 may further comprise, at operation 318, identifying a geographic region of a seller identified in the search results; at operation 320, identifying a language associated with the geographic region of the seller; and, at operation 322, prioritizing the search results based on a matching or similarity between the language of the geographic region of the searching party and the language of the geographic region of the seller.

In some examples, the method 300 may further comprise, at operation 324, assigning a relevance weighting to an item listed in the search results based on a degree of matching or similarity between the language of the geographic region of the searching party and the language of the geographic region of the seller.

The method 300 may further comprise, at operation 326, determining a proficiency of the seller in the language associated with the geographic region of the searching party; and, at operation 328, prioritizing the search results based on the determined proficiency. The determination of the proficiency of the seller in the language associated with the geographic region of the buyer may be based on one or more of: feedback derived from other searching parties in the electronic environment; the results of a language competency test conducted at a time of listing an item for sale in the electronic environment; a language proficiency analysis of a listing of the seller; an analysis of purchase and return dates in the electronic environment; and demographic information associated with the geographic region of the searching party or a seller in the electronic marketplace.

In some examples, the geographic region or language of a searching party (i.e. potential buyer) is established even before a search is conducted. For example, geographic indicators such as a user's IP address, browser language settings, user account-specific data, shipping addresses (default or preferential settings for example), billings addresses on file, language settings, mobile or payment service settings e.g. PayPal™, and the like), can be analyzed to pre-determine a geographic region or language preference of a non-logged-in user (as a potential buyer). Thus, the geographic region and language of a "visitor" user to a website or electronic storefront (marketplace) can advantageously be established before a search is conducted, or search criteria or other enquiry received from the visitor.

Thus, with reference to the operations depicted in FIG. 3 of the accompanying drawings, instead of an example operation sequence of 310 (conduct search), 312 (identifying geographic region), 314 (identify language), and so forth, another example sequence might be 312 (identifying geographic region), 314 (identify language), and then 310 (conduct search). The algorithmic techniques used for a logged-in user can be applied to a non-logged-in user, before or after a search is conducted.

Various combinations of operations, or sequences of operations, are possible. These and other variations in the performance of the method 300 are within the scope of embodiments of the present disclosure.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmissions (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 4:
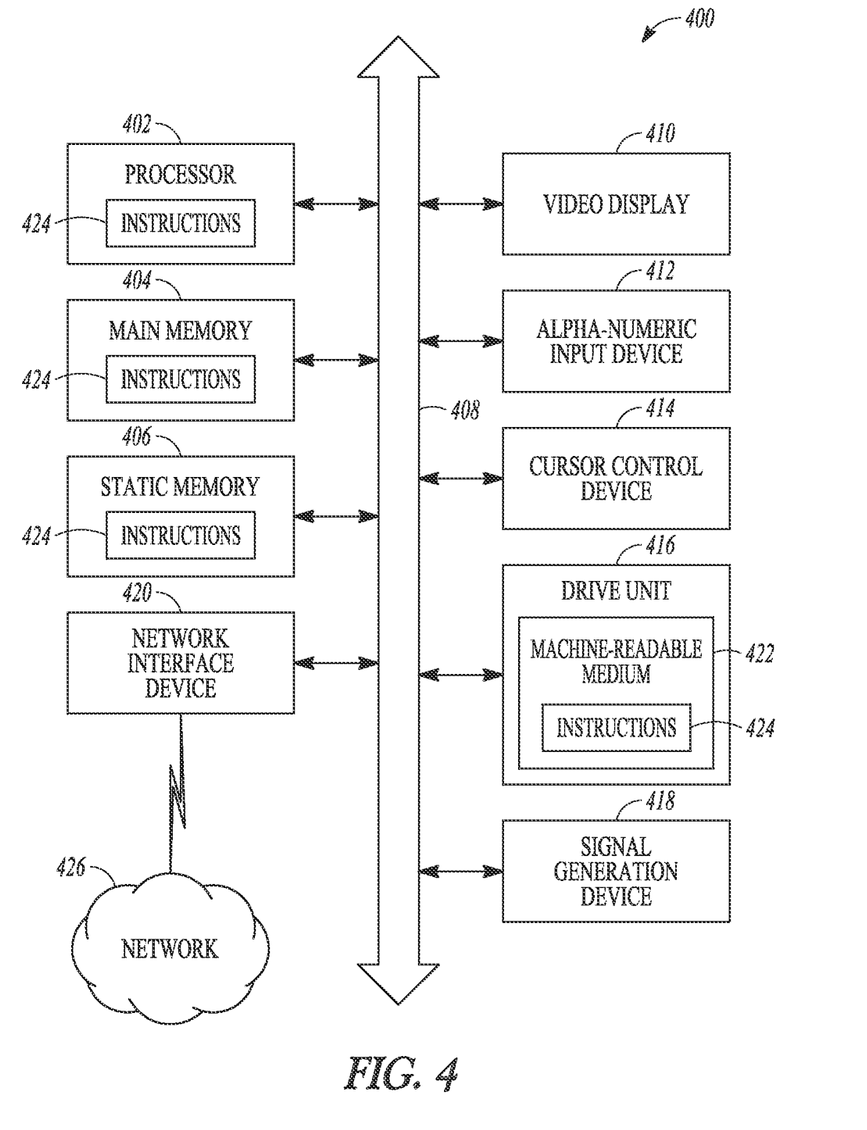
FIG. 4 is a simplified block diagram of a machine in an exemplary form of a computing system within which a set of instructions, for causing the machine to perform any one or more of the methodologies discussed herein, may be executed.

With reference to FIG. 4, an exemplary embodiment extends to a machine in the exemplary form of a computer system 400 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker), and a network interface device 420.

Machine-Readable Medium

The disk drive unit 416 includes a machine-readable medium 422 on which is stored one or more sets of instructions and data structures (e.g., software 424) embodying or used by any one or more of the methodologies or functions described herein. The software 424 may also reside, completely or at least partially, within the main memory 404 or within the processor 402 during execution thereof by the computer system 400, with the main memory 404 and the processor 402 also constituting machine-readable media.

While the machine-readable medium 422 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an embodiment has been described with reference to specific exemplary embodiments, it will be evident that various modifications and changes may be made to these embodiments without departing from the broader spirit and scope of the present subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, particular embodiments describe various arrangements, algorithms, programming tools, and topologies of systems. A skilled artisan will recognize, however, that additional embodiments may be focused on electronic business applications and accompanying system architectures in general and not specifically to electronic searching of consumer sites.

These and various other embodiments are all within a scope of the present subject matter. The specification and drawings are, accordingly, to be regarded in an illustrative rather than a restrictive sense.

What is claimed is:

1. A system for ranking search results in an electronic environment, the system comprising: processors; and a memory storing instructions that, when executed by at least one processor among the processors, cause the system to perform operations comprising:
receiving a search query from a computing device of a searching party located in a geographic region, wherein the search query is received by an online marketplace visited by the searching party using the computing device;
conducting a search and generating search results based on the search query;
retrieving an IP address or a browser language setting of the computing device of the searching party;
identifying the geographic region of the searching party based at least in part on the retrieved IP address or the retrieved browser language setting of the computing device of the searching party;
identifying a language associated with the identified geographic region of the searching party based on the identified geographic region of the searching party;
for a seller associated with at least one of the search results, determining a proficiency in the language associated with the geographic region of the searching party;
ranking the search results based on at least the identified language and the proficiency, wherein search results associated with a higher proficiency in the identified language are ranked higher relative to search results associated with a lower proficiency in the identified language; and
providing the ranked search results to the searching party at the online marketplace.

2. The system of claim 1, further comprising identifying a geographic region of a seller associated with at least one of the search results, identifying a language associated with the geographic region of the seller, and prioritizing the search results based on a matching or similarity between the language of the geographic region of the searching party and the language of the geographic region of the seller.

3. The system of claim 1, further comprising assigning a relevance weighting to an item listed in the search results based on a degree of matching or similarity between the language of the geographic region of the searching party and the language of the geographic region of the seller, wherein the relevance weighing is used for ranking the search results.

4. The system of claim 1, wherein identifying the geographic region of the searching party is additionally based on one or more geographic indicators selected from: an account-specific data associated with the searching party, a shipping address associated with the searching party, a billing address associated with the searching party, a language setting associated with the searching party, and a payment service setting associated with the searching party.

5. The system of claim 1, wherein determining the proficiency of the seller in the language associated with the geographic region of the searching party based on one or more of: feedback derived from searching parties in the electronic environment; the results of a language competency test conducted at a time of listing an item for sale in the electronic environment; a language proficiency analysis of a listing of the seller; an analysis of purchase and return dates in the electronic environment; and demographic information associated with the geographic region of the searching party or the seller in the electronic marketplace.

6. A method of ranking search results in an electronic environment in response to a search query received from a searching party located in a geographic region, the method comprising:
conducting a search and generating search results based on the search query received from a computing device used by the searching party to access an online marketplace;
retrieving an IP address or a browser language setting of the computing device of the searching party;

identifying the geographic region of the searching party based at least in part on the retrieved IP address or the retrieved browser language setting of the computing device;

identifying a language associated with the identified geographic region of the searching party based on the identified geographic region of the searching party, for a seller associated with at least one of the search results, determining a proficiency in the language associated with the geographic region of the searching party;

ranking the search results based at least on the identified language and the determined proficiency, wherein search results associated with a higher proficiency in the identified language are ranked higher relative to search results associated with a lower proficiency in the identified language; and providing the ranked search results to the searching party at the online marketplace.

7. The method of claim 6 further comprising:

identifying a geographic region of the seller;

identifying a language associated with the geographic region of the seller; and ranking the search results based on a matching or similarity between the language of the geographic region of the searching party and the language of the geographic region of the seller.

8. The method of claim 6, wherein ranking the search results additionally includes:

assigning a relevance weighting to an item listed in the search results based on a degree of matching or similarity between the language of the geographic region of the searching party and the language of the geographic region of the seller.

9. The method of claim 6, wherein identifying the geographic region of the searching party is additionally based on one or more geographic indicators selected from: an account-specific data associated with the searching party, a shipping address associated with the searching party, a billing address associated with the searching party, a language setting associated with the searching party, and a payment service setting associated with the searching party.

10. The method of claim 6, wherein determining the proficiency of the seller in the language associated with the geographic region of the searching party is based on one or more of:

feedback derived from searching parties in the electronic environment;

the results of a language competency test conducted at a time of listing an item for sale in the electronic environment;

a language proficiency analysis of a listing of the seller;

an analysis of purchase and return dates in the electronic environment; and demographic information associated with the geographic region of the searching party or the seller in the electronic marketplace.

11. A machine-readable storage medium storing an instruction that, when executed by a processor, causes the processor to perform a method of ranking search results in an electronic environment in response to a search query received from a searching party located in a geographic region, the method comprising:

conducting a search and generating search results based on the search query received from a computing device used by the searching party to access an online marketplace;

retrieving an IP address or a browser language setting of the computing device of the searching party;

identifying the geographic region of the searching party based at least in part on the retrieved IP address or the retrieved browser language setting of the computing device;

identifying a language associated with the identified geographic region of the searching party based on the identified geographic region of the searching party;

for a seller associated with at least one of the search results, determining a proficiency in the language associated with the geographic region of the searching party;

ranking the search results based at least on the identified language and the determined proficiency, wherein search results associated with a higher proficiency in the identified language are ranked higher relative to search results associated with a lower proficiency in the identified language: and providing the ranked search results to the searching party at the online marketplace.

12. The machine-readable storage medium of claim 11, wherein the method further comprises:

identifying a geographic region of the seller;

identifying a language associated with the geographic region of the seller; and ranking the search results based on a matching or similarity between the language of the geographic region of the searching party and the language of the geographic region of the seller.

13. The machine-readable storage medium of claim 11 wherein ranking the search results includes:

assigning a relevance weighting to an item listed in the search results based on a degree of matching or similarity between the language of the geographic region of the searching party and the language of the geographic region of the seller.

14. The machine-readable storage medium of claim 11, wherein identifying the geographic region of the searching party is additionally based on one of more geographic indicators selected from: an account-specific data associated with the searching party, a shipping address associated with the searching party, a billing address associated with the searching party, a language setting associated with the searching party, and a payment service setting associated with the searching party.

15. The machine-readable storage medium of claim 11, wherein determining the proficiency of the seller in the language associated with the geographic region of the searching party is based on one or more of:

feedback derived from searching parties in the electronic environment;

the results of a language competency test conducted at a time of listing an item for sale in the electronic environment;

a language proficiency analysis of a listing of the seller;

an analysis of purchase and return dates in the electronic environment; and demographic information associated with the geographic region of the searching party or the seller in the electronic marketplace.

* * * * *

UNITED STATES PATENT AND TRADEMARK OFFICE
CERTIFICATE OF CORRECTION

| | | |
|---|---|---|
| PATENT NO. | : 9,959,559 B2 | Page 1 of 1 |
| APPLICATION NO. | : 14/169856 | |
| DATED | : May 1, 2018 | |
| INVENTOR(S) | : Frederic Billou | |

It is certified that error appears in the above-identified patent and that said Letters Patent is hereby corrected as shown below:

On the Title Page

In item (71), in Column 1, in "Applicant", Line 1, delete "Inc." and insert -- Inc., San Jose, CA (US) --, therefor.

In the Claims

In Column 16, Line 42, in Claim 14, delete "of" and insert -- or --, therefor.

Signed and Sealed this
Twelfth Day of February, 2019

Andrei Iancu
*Director of the United States Patent and Trademark Office*